(12) United States Patent
Nakane

(10) Patent No.: US 10,634,857 B2
(45) Date of Patent: Apr. 28, 2020

(54) CLEANING TOOL OF OPTICAL CONNECTOR

(71) Applicant: FUJIKURA LTD., Tokyo (JP)

(72) Inventor: Junichi Nakane, Sakura (JP)

(73) Assignee: Fujikura Ltd., Tokyo (JP)

( * ) Notice: Subject to any disclaimer, the term of this patent is extended or adjusted under 35 U.S.C. 154(b) by 541 days.

(21) Appl. No.: 14/739,168

(22) Filed: Jun. 15, 2015

(65) Prior Publication Data

US 2015/0362680 A1 Dec. 17, 2015

(30) Foreign Application Priority Data

Jun. 13, 2014 (JP) ................................ 2014-122276

(51) Int. Cl.
| | |
|---|---|
| *G02B 6/00* | (2006.01) |
| *G02B 6/38* | (2006.01) |
| *B08B 1/00* | (2006.01) |
| *A46B 7/06* | (2006.01) |

(52) U.S. Cl.
CPC .............. *G02B 6/3866* (2013.01); *B08B 1/00* (2013.01); *A46B 7/06* (2013.01); *B08B 1/006* (2013.01); *B08B 1/008* (2013.01); *B08B 2240/02* (2013.01)

(58) Field of Classification Search
CPC ..... G02B 6/3866; B08B 1/00; B08B 2240/02; B08B 1/006; A46B 7/06
USPC .......... 15/210.1, 97.1, 104.001; 385/134, 147
See application file for complete search history.

(56) References Cited

U.S. PATENT DOCUMENTS

| | | | | |
|---|---|---|---|---|
| 5,220,703 | A * | 6/1993 | Kanayama ................ | B08B 1/00 15/210.1 |
| 6,425,692 | B1 * | 7/2002 | Fujiwara ............... | G02B 6/3897 385/53 |
| 8,336,149 | B2 * | 12/2012 | Blair ........................ | B08B 1/00 15/104.001 |
| 9,134,485 | B2 * | 9/2015 | Fujiwara ............... | G02B 6/3866 |
| 2014/0144468 | A1 * | 5/2014 | Nakane ................... | B08B 1/006 134/6 |
| 2014/0259481 | A1 | 9/2014 | Fujiwara et al. | |

FOREIGN PATENT DOCUMENTS

| | | |
|---|---|---|
| JP | 4101486 B2 | 6/2008 |
| JP | 2009-229843 A | 10/2009 |
| JP | 5238873 B | 7/2013 |
| JP | 2014-35489 A | 2/2014 |

\* cited by examiner

*Primary Examiner* — Monica S Carter
*Assistant Examiner* — Katina N. Henson
(74) *Attorney, Agent, or Firm* — Osha Liang LLP

(57) ABSTRACT

A cleaning tool for cleaning an optical connector including a plurality of ferrules, including: a plurality of heads whose pressing surfaces are spanned by a cleaner, each of the pressing surfaces being for pressing the cleaner against the ferrules; a guide member that is placed sandwiched between the heads, and that guides the heads in such a manner that the heads can move rearward; and a cover that accommodates the plurality of heads and the guide member and that exposes the cleaner.

7 Claims, 10 Drawing Sheets

CLEANING TOOL OF OPTICAL CONNECTOR

CROSS-REFERENCE TO RELATED APPLICATIONS

The present application claims priority from Japanese Patent Application No. 2014-122276 filed on Jun. 13, 2014, which is herein incorporated by reference.

BACKGROUND

Technical Field

The invention relates to a cleaning tool of an optical connector.

Related Art

Cleaning tools are known to clean the connecting end faces of an optical connector (the end faces of a ferrule). For example, the cleaning tool disclosed in Japanese Patent Application Laid-open Publication No. 2014-35489 includes a tool body and an extending section which is capable of moving relative to the tool body and extends from the tool body. In the cleaning tool, a cleaning tool body moves toward the extending section in a state which an cleaner is pressed against an optical connector by the tip head of the extending section, and the cleaner cleans the end faces of a ferrule of an optical connector. In the cleaning tool disclosed in Japanese Patent No. 5238873, a cleaner is pushed against an optical connector by the tip head of an extending section, and the connecting end face of the optical connector is cleaned.

Cleaning the end faces of a plurality of ferrules simultaneously is known as a method for increasing efficiency. A cleaning tool disclosed in Japanese Patent No. 5238873 includes two head members, and cleans the end faces of a plurality of ferrules simultaneously. A cleaning tool disclosed in Japanese Patent No. 4101486 also cleans the end faces of a plurality of ferrules simultaneously.

Japanese Patent No. 4101486 and Japanese Patent Application Laid-open Publication No. 2009-229843 describe that an optical connector (backplane connector) attached to a backplane board which is located further inside a plug-in unit is cleaned by sliding in guide grooves a board to which cleaning tools are attached (see FIG. 5 of Japanese Patent No. 4101486, for example).

In a cleaning tool disclosed in Japanese Patent No. 4101486, a cleaner is wrapped around across an area which will be used to clean the connecting end faces of a plurality of ferrules, and this makes it possible to clean the connecting end faces of a plurality of ferrules simultaneously. However, a cleaning tool of Japanese Patent No. 4101486 does not include a member corresponding to a head member disclosed in Japanese Patent No. 5238873 and not include a member corresponding to a guide member which guides such a head member, either. Instead thereof, an elastic member is placed on the surface opposite the cleaning surface of the cleaner (see FIGS. 6 and 7 of Japanese Patent No. 4101486). In the configuration in which an elastic member push a cleaner against a ferrule as mentioned above, it is difficult to push the cleaner at a predetermined pressure. In a configuration in which an elastic member allows a cleaner to be pushed against a ferrule at a predetermined pressure, the elastic member is large. In this case, it is necessary to widen a distance between elastic members, and this makes it difficult to clean a plurality of densely-packed ferrules (a plurality of ferrules arranged at short intervals).

In a cleaning tool disclosed in Japanese Patent No. 5238873, the following components are provided for each head member: a mechanism to supply a cleaner to the head members; a tip tube into which the head member is inserted; and the like. This configuration increases the number of components and also widens a distance between the head members. This makes it difficult to clean a plurality of densely-packed ferrules (a plurality of ferrules arranged at short intervals).

SUMMARY

An aspect of the present invention is to provide a cleaning tool of simple configuration which is capable of cleaning a plurality of densely-packed ferrules.

An aspect of the invention to achieve the above advantage is a cleaning tool for cleaning an optical connector including a plurality of ferrules, including: a plurality of heads whose pressing surfaces are spanned by a cleaner, each of the pressing surfaces being for pressing the cleaner against the ferrules; a guide member that is placed sandwiched between the heads, and that guides the heads in such a manner that the heads can move rearward; and a cover that accommodates the plurality of heads and the guide member and that exposes the cleaner.

Other features of this invention will become apparent from the description in this specification and the attached drawings.

BRIEF DESCRIPTION OF THE DRAWINGS

FIG. 6A is a diagram illustrating the head section 9A before cleaning. FIG. 6B is a diagram illustrating the head section 9A which is being cleaned.

DESCRIPTION OF EXEMPLARY EMBODIMENTS

At least the following matters will be made clear by the following description of the present specification and the accompanying drawings.

A cleaning tool for cleaning an optical connector including a plurality of ferrules, including: a plurality of heads whose pressing surfaces are spanned by a cleaner, each of the pressing surfaces being for pressing the cleaner against the ferrules; a guide member that is placed sandwiched between the heads, and that guides the heads in such a manner that the heads can move rearward; and a cover that accommodates the plurality of heads and the guide member and that exposes the cleaner.

With such a cleaning tool, it is possible to clean a plurality of densely-packed ferrules using a cleaning tool of simple configuration.

It is desirable that each of the heads is placed sandwiched between an inner wall of the cover and the guide member. This makes it possible to limit a direction in which the heads move.

It is desirable that a flange section is formed in each of the heads, that a rail section is formed in the guide member, and that the head is guided by the flange section that is received in the rail section. In a state in which each of the heads is placed sandwiched between the inner wall of the cover and the guide member, the flange section is less likely to be disengaged from the rail section.

It is desirable that the optical connector has a housing that accommodates the ferrules, and that an edge of an opening of the cover constitutes a meeting section that is for meeting the housing, the opening being placed on a side towards the optical connector. This allows the cleaner to be pressed against the ferrule at a predetermined pressure.

It is desirable that the housing includes: an inner housing that accommodates the ferrules; and an outer housing which accommodates the inner housing, that the cover includes a wall section constituting a meeting section that is for meeting the inner housing, and that the wall section is guided by an inner wall of the outer housing. This enables alignment of the cleaner to the optical connector (the ferrules).

It is desirable that the optical connector is a backplane connector that is attached to a connector wall located further inside a plug-in unit, and that the cleaning tool is attached to a board that is capable of sliding in a guide groove formed on the plug-in unit, the guide groove being for a printed board. This makes it possible to simplify cleaning operation of the optical connector located further inside a plug-in unit.

First Embodiment

Overview of Cleaning Tool 1

Figure 1:
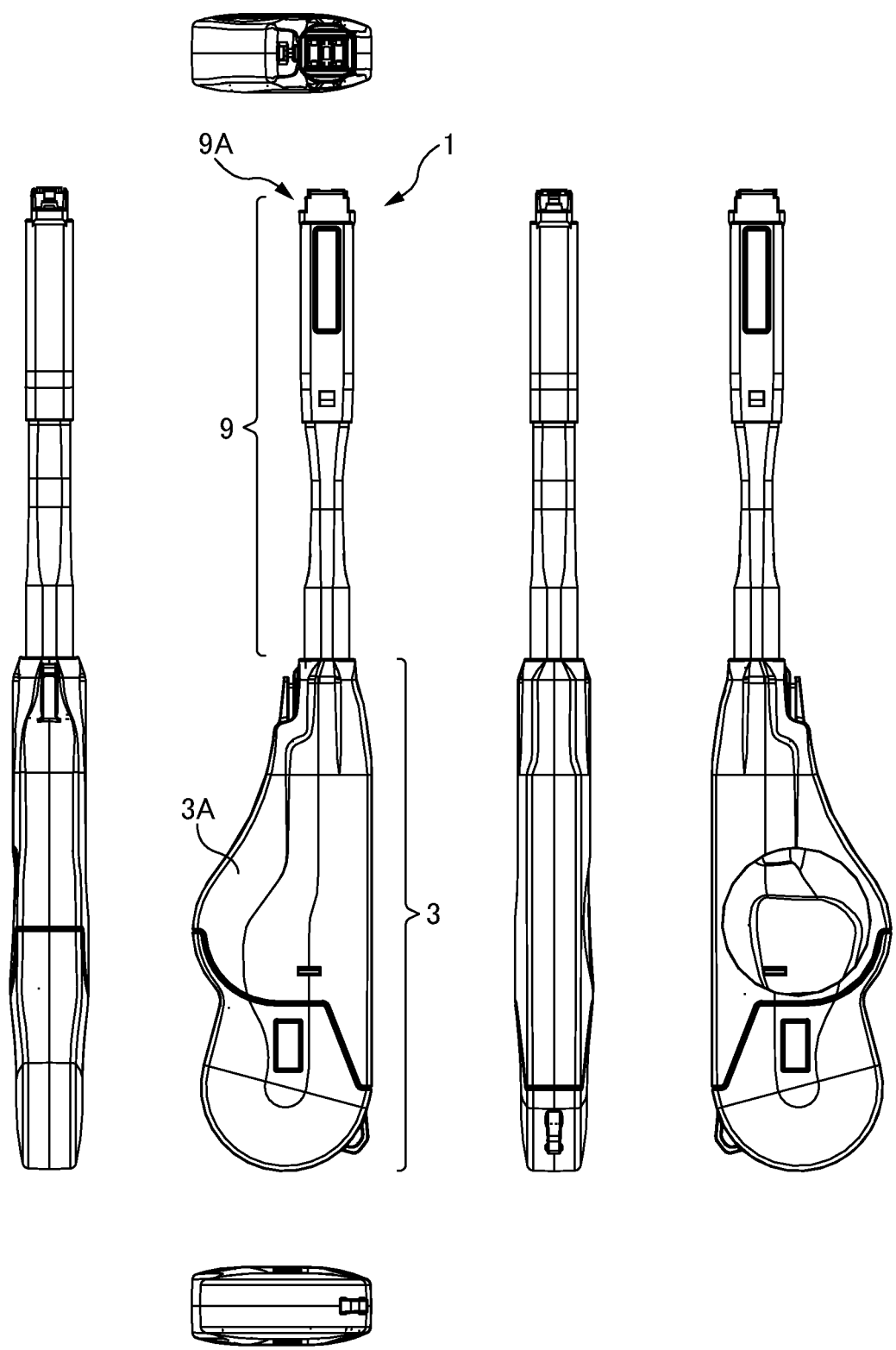
FIG. 1 is orthogonal projections of a cleaning tool 1 according to the first embodiment.
Figure 2A:
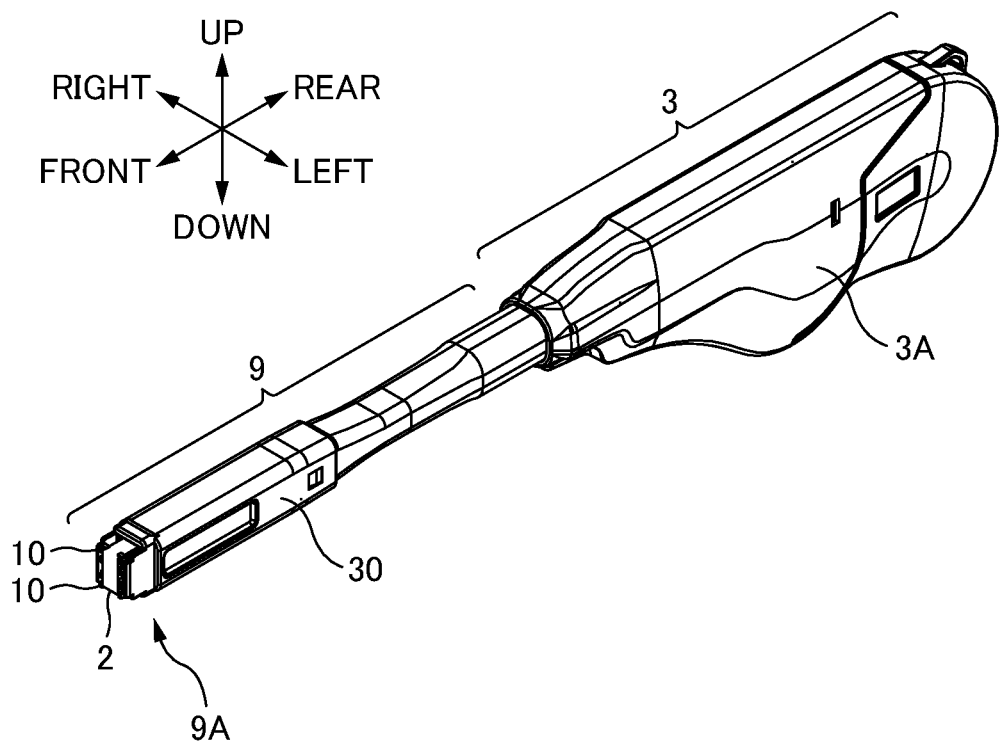
FIG. 2A is a perspective view of the cleaning tool 1 according to the first embodiment.
Figure 2B:
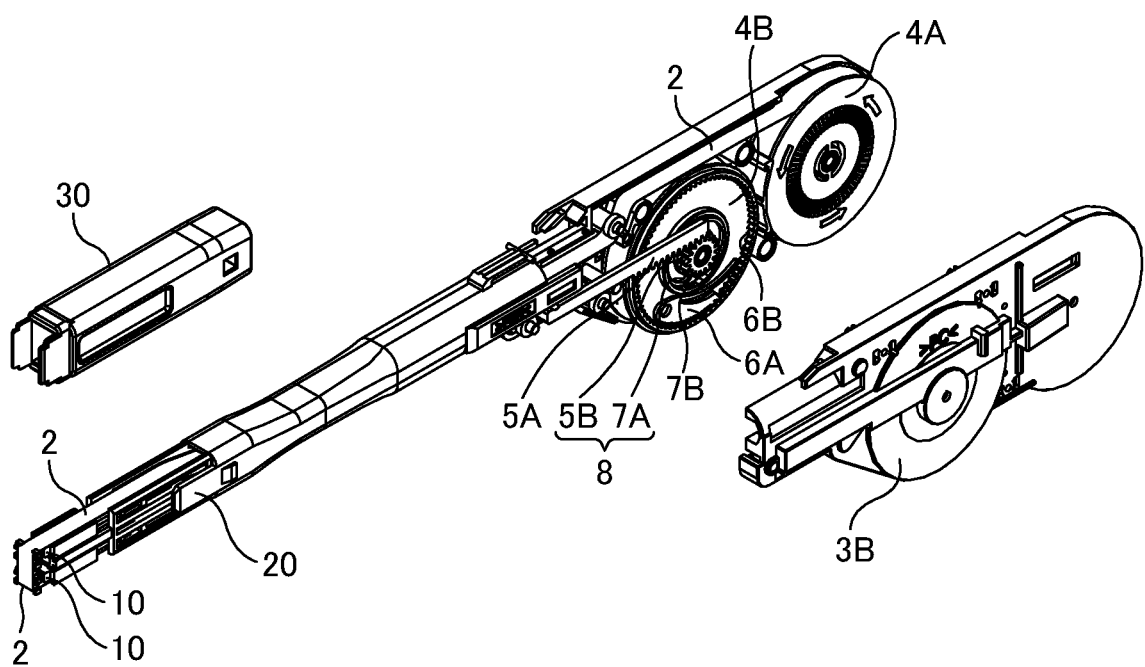
FIG. 2B is an exploded perspective view of the cleaning tool 1 from which the head cover 30 of an extending section 9 and the body cover 3A and the body housing 3B of a tool body 3 are removed.

FIG. 1 illustrates orthogonal projections of a cleaning tool 1 according to the first embodiment. FIG. 2A is a perspective view of the cleaning tool 1 according to the first embodiment. FIG. 2B is an exploded perspective view of the cleaning tool 1 from which the head cover 30 of an extending section 9 and the body cover 3A and the body housing 3B of a tool body 3 are removed.

In the following description, the directions are defined as shown in FIG. 2A. That is, the "front-rear direction" is defined along a direction in which the extending section 9 extends from the tool body 3 (a direction in which the extending section 9 stretches relative to the tool body 3): the side close to the extending section 9 with respect to the tool body 3 is defined as "front", and the opposite side is defined as "rear". The "up-down direction" is defined along a direction in which a plurality of heads 10 (two heads 10 herein: see FIGS. 3A and 3B) of the cleaning tool 1 are arranged: the upstream side in a direction in which a cleaner 2 is transported on the heads 10 is "up", and the opposite side is "down". A direction perpendicular to the front-rear direction and the up-down direction is defined as the "left-right direction": the right side as viewed from the rear side towards the front side is defined as "right", and the opposite side is "left".

The cleaning tool 1 is used for cleaning an optical connector 50 (described later: see FIG. 5). The shape of the optical connector 50 which is to be cleaned will be described below. The cleaning tool 1 includes: the tool body 3; and the extending section 9 which extend beyond the opening of the tool body 3. The extending section 9 is movable (stretchable) in the front-rear direction relative to the tool body 3.

The extending section 9 has a head section 9A. The head section 9A is a part for pushing the cleaner 2 against the connecting end faces of the optical connector 50 (the end faces of the ferrules 51). The head section 9A is located in the front end of the extending section 9, and the cleaner 2 is exposed so that the cleaner 2 can be pushed against the optical connector 50.

When cleaning the optical connector 50 with the cleaning tool 1, an operator who holds the tool body 3 together with the body cover 3A pushes the cleaner 2 of the head section 9A against the optical connector 50. While keeping the state, the operator moves the tool body 3 forward (towards the optical connector 50) (pushing operation). At this stage, the rear part of the extending section 9 is received inside the tool body 3. Next, the operator moves the tool body 3 rearward and removes the head section 9A from the optical connector 50 (pulling operation). At this stage, by a coil spring (not shown) disposed in the tubular body of the extending section 9, the extending section 9 which has been received inside the tool body 3 returns to the original position.

As a result of pushing operation and pulling operation by an operator, the tool body 3 and the extending section 9 move relative to each other (linearly) in the front-rear direction. The cleaning tool 1, due to this relative movement, supplies an unused portion of the cleaner 2 from a supply reel 4A and winds (recovers) a used portion of the cleaner 2 around a takeup reel 4B.

As a winding mechanism which winds the cleaner 2, the cleaning tool 1 includes: a rack-and-pinion mechanism 5A and 5B; a ratchet mechanism 6A and 6B; and a friction transmission mechanism 7A and 7B. The rack-and-pinion mechanism 5A and 5B is a conversion mechanism which converts linear motion between the tool body 3 and the extending section 9 into rotational motion. The rack-and-pinion mechanism 5A and 5B has a rack 5A and a pinion 5B; the rack 5A is a linear gear located on the side towards the extending section 9, and the pinion 5B is a circular gear provided in a transmission wheel 8 on the side towards the tool body 3. The ratchet mechanism 6A and 6B is a mechanism which limits the rotational direction of the takeup reel 4B to a certain direction (a direction in which the cleaner 2 is wound). The ratchet mechanism 6A and 6B has a pawl 6A and a ratchet gear 6B; the pawl 6A is attached to the housing of the tool body 3, and the ratchet gear 6B is provided in the takeup reel 4B. The friction transmission mechanism 7A and 7B is a mechanism which transmits torque of the transmission wheel 8 to the takeup reel 4B through frictional force. The friction transmission mechanism 7A and 7B has a friction plate 7A and a friction surface 7B; the friction plate 7A is provided on the transmission wheel 8, and the friction surface 7B is provided on the takeup reel 4B.

In the pushing operation during cleaning, the rack 5A of the extending section 9 moves rearward relative to the pinion 5B, and the transmission wheel 8 in FIG. 2B (the pinion 5B) rotates clockwise. At this stage, clockwise rotation of the takeup reel 4B is restricted by the ratchet mechanism 6A and 6B. Slip occurs between the friction plate 7A and the friction surface 7B of the friction transmission mechanism 7A and 7B, and the transmission wheel 8 idles. Consequently, the takeup reel 4B does not rotate.

In the pulling operation during cleaning, the rack 5A of the extending section 9 moves forward relative to the pinion 5B, and the transmission wheel 8 in FIG. 2B (the pinion 5B) rotates counterclockwise. The ratchet mechanism 6A and 6B allows the takeup reel 4B to rotate counterclockwise. Torque of the transmission wheel 8 (the pinion 5B) is transmitted to the takeup reel 4B, and the takeup reel 4B rotates counterclockwise (a direction in which the cleaner 2 is wound). Consequently, the cleaner 2 is wound around the takeup reel 4B. The cleaner 2 is supplied from the supply reel 4A by an amount corresponding to the amount of the cleaner 2 which is wound around the takeup reel 4B.

Head Section 9A of Cleaning Tool 1

Figure 3A:
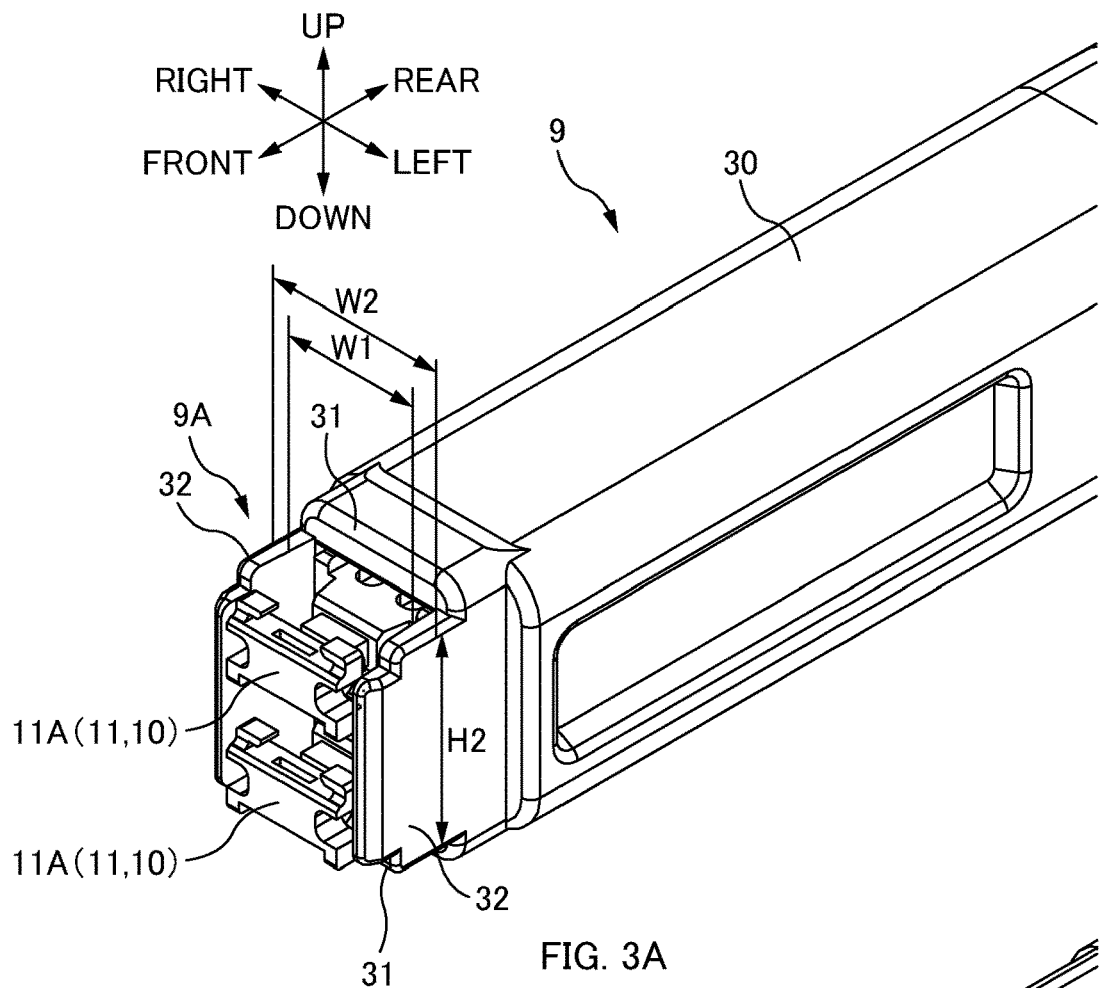
FIGS. 3A and 3B are perspective views of the head section 9A of the cleaning tool 1.
Figure 3B:
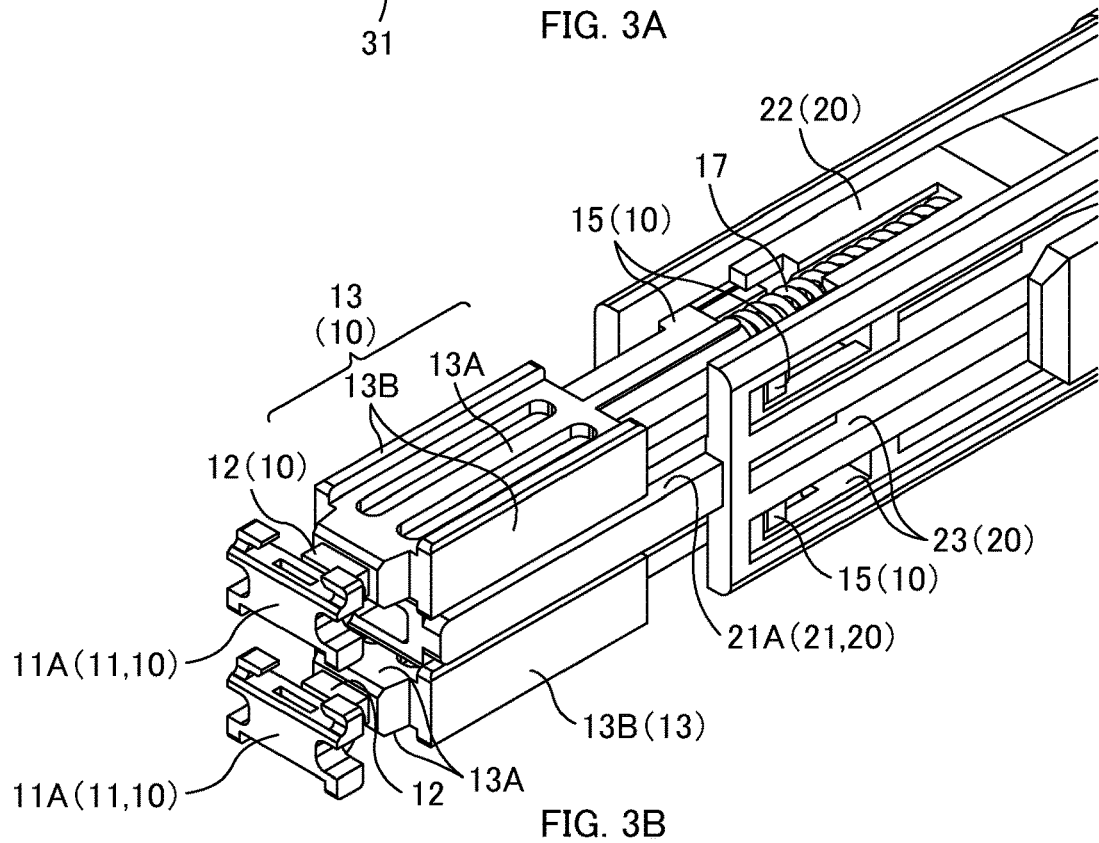
Figure 4:
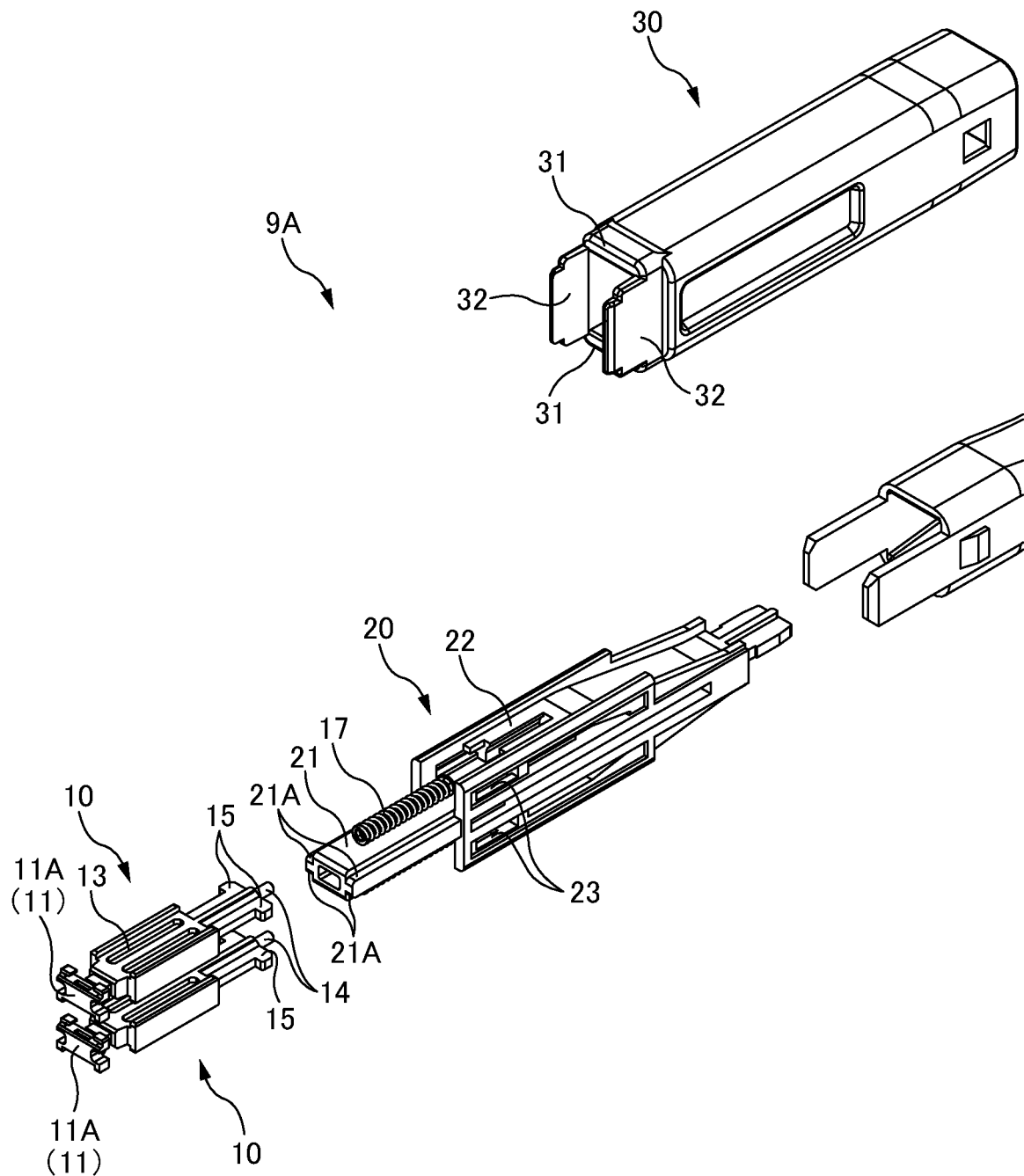
FIG. 4 is an exploded view of the head section 9A.

FIGS. 3A and 3B are perspective views of the head section 9A of the cleaning tool 1. FIG. 3A shows the head section 9A when the cleaner 2 is removed. FIG. 3B shows the head section 9A when the head cover 30 is also removed. FIG. 4 is an exploded view of the head section 9A.

The head section 9A has a plurality of (two in this embodiment) heads 10, a plurality of (two in this embodiment) pressing springs 17, a guide member 20, and the head cover 30.

Each of the heads 10 is a member for pressing the cleaner 2 against the connecting end faces of the optical connector 50 (the end faces of the ferrules 51). The head 10 has a pressing section 11, a tilting spring 12, a guiding section 13, a spring-fixing section 14 and protrusions 15.

The pressing section 11 has a pressing surface 11A which is for pressing the cleaner 2 against the optical connector 50, and is placed in the front end of the head 10. Around the pressing surface 11A, the cleaner 2 is wrapped; an unused portion of the cleaner 2 is supplied to the pressing surface 11A from the above, and a used portion of the cleaner 2 is transported to the below from the pressing surface 11A. In the rear side of the pressing section 11, the tilting spring 12 is placed.

The tilting spring 12 deforms elastically, thereby tilting the pressing section 11 (the pressing surface 11A) according to the inclinations of the connecting end faces of the optical connector 50 (the end faces of the ferrules 51).

The guiding section 13 has an H-shaped cross section. The guiding section 13 is a part which guides the head 10 relative to the guide member 20 in the front-rear direction while guiding the cleaner 2 in the front-rear direction. The guiding section 13 has guide surfaces 13A and flange sections 13B. The outward one of the upper and lower guide surfaces 13A (the guide surface 13A which faces the inner wall of corresponding one of the upper and lower wall sections 31 of the head cover 30) guide the cleaner 2 in the front-rear direction. In other words, the cleaner 2 passes through a space between the guide surface 13A and the inner wall of the wall section 31 of the head cover 30. The inward one of the upper and lower guide surfaces 13A (the guide surface 13A which faces the guide member 20) is guided by the guide member 20. The flange sections 13B are parts (end sections) extending in the up-down direction on the right and left sides. In the up-down direction, each flange section 13B is sandwiched between the rail sections 21A of the guide member 20 and the inner wall of corresponding one of the upper and lower wall sections 31 of the head cover 30. The outer surface of each of the left and right flange sections 13B faces the inner wall of corresponding one of the left and right wall sections 32 of the head cover 30. And, in the left-right direction, the guiding section 13 is sandwiched between the inner walls of the left and right wall sections 32 of the head cover 30. Thus, the flange sections 13B are restricted in the up-down direction and the left-right direction by the inner walls of the head cover 30, and this allows the head 10 to move in the front-rear direction and concurrently restricts the head 10 to move in the other directions.

The spring-fixing section 14 is a part which fixes the front end of the corresponding pressing spring 17. The pressing spring 17 is deformed by compression, and the head 10 is always pushed forward by the pressing spring 17.

The protrusions 15 are parts which protrude outwardly behind the head 10 in a symmetrical manner. Each protrusion 15 of the head 10 is placed in corresponding one of guide windows 23 which are formed in the guide member 20. The head 10 is pushed by the pressing spring 17 forward, and the protrusions 15 are in normal state (except when cleaning is performed) in contact with the front edges of the guide windows 23.

In the present embodiment, the plurality of (two in this embodiment) heads 10 is provided in the head section 9A. Two upper and lower heads 10 are placed so that the guide member 20 is sandwiched therebetween. The set of the two heads 10 can clean the two connecting end faces of the optical connector 50 (the end faces of two ferrules 51) simultaneously. The heads 10 can move in the front-rear direction independently of each other. Accordingly, each head 10 can push the cleaner 2 against the end faces of the corresponding ferrule 51 at predetermined pressure.

In the present embodiment, the cleaner 2, which is shared by the plurality of (two in this embodiment) heads 10, spans the pressing surfaces 11A of the heads 10. With shared mechanisms (e.g. the rack-and-pinion mechanism 5A and 5B, the ratchet mechanism 6A and 6B, and the friction transmission mechanism 7A and 7B), an unused portion of the cleaner 2 is supplied to two heads 10 and a used portion of the cleaner 2 is wound from two heads 10. The mechanisms for supplying and winding the cleaner 2 thus are shared, and this makes it possible to reduce the number of components constituting the cleaning tool 1.

The pressing spring 17 is located between the corresponding head 10 and the guide member 20, and presses forward the head 10 relative to the guide member 20. The front end of the pressing spring 17 is fixed to the spring-fixing section 14 of the head 10, and the rear end of the pressing spring 17 is fixed to the guide member 20. The pressing spring 17 is placed between the head 10 and the guide member 20, while being deformed by compression. In cleaning, the head 10 which is pushed forward by the pressing spring 17 is subject to a rearward force due to pressure by the optical connector 50. As a result, the pressing spring 17 is further deformed by compression, and the head 10 moves rearward relative to the guide member 20. This allows the head 10 to push the cleaner 2 against the end face of the corresponding ferrule 51 at predetermined pressure.

The guide member 20 guides the plurality of (two in this embodiment) heads 10 in such a manner that the heads can move in the front-rear direction. The guide member 20 has head guiding section 21, spring holders 22 and the guide windows 23.

The head guiding section 21 is a part which guides the plurality of (two in this embodiment) heads 10 in such a manner that the heads can move in the front-rear direction. The head guiding section 21 is placed in the front side of the guide member 20, and the heads 10 are respectively placed on the upper and lower sides of the head guiding section 21. The upper and lower surfaces of the head guiding section 21 face the guide surfaces 13A of the heads 10, and guide the head 10. On the upper and lower surfaces of the head guiding section 21, the rail sections 21A (depressions) are formed. The flange sections 13B of the head 10 are received in the rail sections 21A, and the head 10 is guided in the front-rear direction.

The spring holders 22 are parts each of which accommodates the rear end of the pressing spring 17; the pressing spring 17 is a component which presses the head 10 forward. The pressing spring 17 is accommodated in the spring holders 22 in a stretchable manner, and the rear end of the pressing spring 17 is fixed inside the spring holders 22, being in contact with the wall of the guide member 20.

The guide windows 23 are windows (openings) formed along the front-rear direction on the left and right walls of the guide member 20. In the guide windows 23, the protrusions 15 of the heads 10 are placed. The front edge of each guide window 23 fastens a protrusion 15 of a head 10 so that the head 10 pushed forward by the pressing spring 17 does not drop forward.

In the present embodiment, the guide member 20 is placed so as to be sandwiched between the heads 10, and two heads 10 are guided by the shared guide member 20 (the head guiding section 21) in such a manner that the heads can move rearward. Compared to the cases in which the guide member 20 is individually prepared for each head 10, this makes it possible to reduce the number of components. Additionally, compared to the cases in which the guide member 20 is individually prepared for each head 10, this also makes it possible to narrow the distance between the heads 10 in the up-down direction, and it accordingly becomes possible to clean the plurality of (two in this embodiment) densely-packed ferrules 51 (two ferrules 51 whose distance in the up-down direction is small).

In the present embodiment, the shared cleaner 2 spans the plurality of (two in this embodiment) heads 10 between which the guide member 20 is sandwiched, and each of the heads 10 by the cleaner 2. It is therefore easy for the guide member 20 to guide the heads 10 on the up and down sides of the head guiding section 21.

The head cover 30 is a rectangular tubular member which accommodates the heads 10, the pressing spring 17 and the guide member 20 while being placed in the front side of the extending section 9. The head cover 30 has openings on its front side and rear side. From the front opening of the head cover 30, the cleaner 2 on the heads 10 is exposed (see FIG. 2A). At the rear opening of the head cover 30, an unused portion of the cleaner 2 is supplied from the supply reel 4A located upstream, and a used portion of the cleaner 2 is discharged to the takeup reel 4B located downstream.

The rectangular tubular head cover 30 has the upper and lower wall sections 31 and the left and right wall sections 32. The inner walls of these wall sections 31 and 32 restrict the head 10 to move only in the front-rear direction. Between the guide member 20 and the inner walls of the upper and lower wall sections 31 of the head cover 30, the guiding sections 13 of the heads 10 is sandwiched in the up-down direction. In a state in which the flange sections 13B of each head 10 are received in the rail sections 21A of the guide member 20, the head 10 is placed sandwiched between the inner wall of corresponding one of the upper and lower wall sections 31 of the head cover 30 and the guide member 20. Accordingly, the flange sections 13B are less likely to be disengaged from the rail sections 21A. Between the inner walls of the left and right wall sections 32 of the head cover 30, the outer surfaces of the left and right flange sections 13B are sandwiched in the left-right direction. This allows the heads 10 to move in the front-rear direction and restricts the heads 10 to move in any other direction.

The front edge of the head cover 30 (the edge of the front opening) serves as a meeting section which meets, in cleaning, the housings of the optical connector 50 (an outer housing 53 or an inner housing 52) (described later: see FIG. 6B). The front edges of the left and right wall sections 32 of the head cover 30 will meet the front end of the inner housing 52. The front edges of the upper and lower wall sections 31 of the head cover 30 will meet the front edges of the outer housing 53 of the optical connector 50. It is not necessary that the pair of the upper and lower wall sections 31 and the pair of the left and right wall sections 32 both meet any housing of the optical connector 50 (the outer housing 53 or the inner housing 52). That is, it is acceptable that either one pair of the wall sections alone meets any housing of the optical connector 50. In this case, it is preferable that the other pair of the wall sections meets a housing of another optical connector (mating optical connector).

The left and right wall sections 32 of the head cover 30 protrude beyond the upper and lower wall sections 31 forward. In cleaning, the head section 9A is inserted into the optical connector 50, and then the left and right wall sections 32 protruding forward are inserted into the optical connector 50. In this case, as will be described later, the outer surfaces of the left and right wall sections 32 of the head cover 30 is guided by inner walls of the optical connector 50 (the left and right inner walls of the outer housing 53), and alignment of the head section 9A to the optical connector 50 is performed in the left-right direction. The upper and lower edges of parts of the left and right wall sections 32 which protrude forward are guided by inner walls of the optical connector 50 (the upper and lower inner walls of the outer housing 53), and alignment of the head section 9A to the optical connector 50 is performed in the up-down direction.

In the present embodiment, the plurality of (two in this embodiment) heads 10 and the guide member 20 are accommodated inside the shared head cover 30. Compared to the cases in which each head 10 is individually accommodated in different head cover 30, this makes it possible to reduce the number of components. Additionally, compared to the cases in which each head 10 is individually accommodated in different head cover 30, it becomes possible to narrow the distance of the head 10 in the up-down direction, and it accordingly becomes possible to clean the plurality of (two in this embodiment) densely-packed ferrules 51 (two ferrules 51 whose distance in the up-down direction is small).

Cleaning of Optical Connector 50

Figure 5:
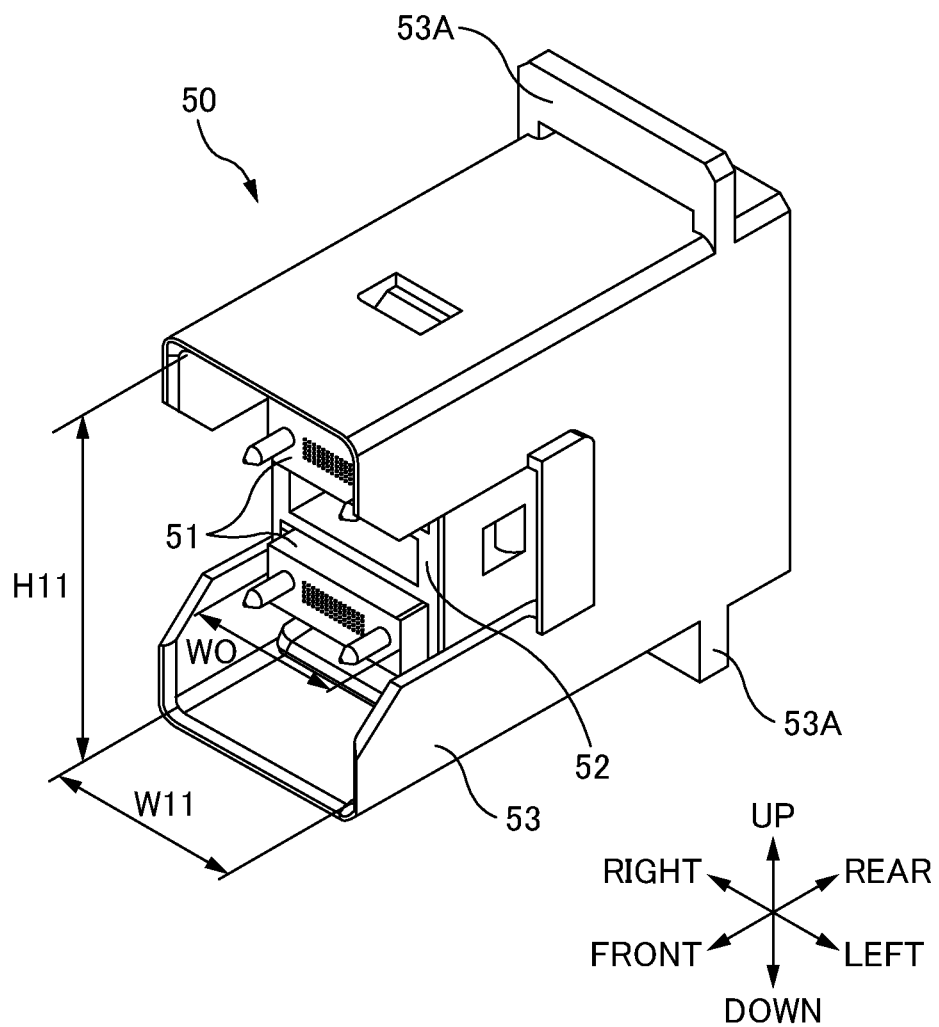
FIG. 5 is a perspective view of an optical connector 50 which is to be cleaned.

FIG. 5 is a perspective view of an optical connector 50 which is to be cleaned. In the description of the optical connector 50, the side towards the end faces of the ferrules 51 is defined as "front" and the opposite side is defined as "rear", in some cases.

The optical connector 50 has a plurality of (two in this embodiment) ferrules 51, the inner housing 52, and an outer housing 53.

The ferrules 51 are members which hold a plurality of optical fibers; in this embodiment, MT type (Mechanically Transferable) optical connectors (F12 type optical connector prescribed in JIS C5981). Guide pins protrude from the end faces of the ferrules 51. The guide pins are inserted into guide pin holes of the ferrules of a mating optical connector. The end faces of the ferrules 51 are parallel to the up-down direction in this embodiment, but in some cases, the end faces are tilted.

The inner housing 52 is a member (housing) which accommodates the ferrules 51 in such a manner that the ferrules can move rearward. In the ferrule accommodating section of the inner housing 52, protrusions (not shown) are formed. While these protrusions and the flanges of the ferrules 51 are engaged with each other, the ferrules 51 are pushed forward by the reaction force of the coil spring (not shown) of a floating mechanism (not shown). When a mating optical connector is connected, the end faces of the ferrules 51 meet each other. This makes the end faces of the optical fibers to physically meet each other, and optical fibers are optically connected. Since the end faces of the optical fibers meet each other at a predetermined force, the ferrules 51 are pressed forward inside the inner housing 52 by the floating mechanism and are accommodated in such a manner that the ferrules can move rearward. The ferrules 51 in the figure are located at the initial position (the position where the protrusions are engaged with the flanges of the ferrules 51). When connecting the optical connectors, the end faces of the ferrules 51 meet each other, and the ferrules 51 slightly move rearward from the initial position. In cleaning, when the heads 10 push the cleaner 2 against the end faces of the ferrules 51, the ferrules 51 slightly move rearward from the initial position.

The inner housing 52 accommodates a plurality of (two in this embodiment) ferrules 51 which are arranged in the up-down direction. The end faces of two ferrules 51 similarly protrude forward beyond the front end of the inner housing 52. Between two ferrules 51, there is no member which protrudes forward beyond the end faces of the ferrules 51. That is, there is no wall member between a plurality of (two in this embodiment) ferrules 51, and this allows a plurality of ferrules 51 to be placed with a high density in the up-down direction.

The outer housing 53 is an accommodating member (housing) which accommodates the inner housing 52. The optical connector 50 in the figure is a backplane optical connector attached to a connector wall of a plug-in unit (midplane or backplane), and the outer housing 53 is attached to the connector wall. The outer housing 53 has contact protrusions 53A, and the contact protrusions 53A cause the outer housing 53 to be attached to the connector wall using clips (not shown).

The distance between the inner walls of the left and right wall sections 32 of the head cover 30 shown in FIGS. 3A and 4 is substantially the same as the length in the left-right direction of the space in the inner housing 52 of the optical connector 50 shown in FIG. 5. Accordingly, in cleaning, the front edges of the left and right wall sections 32 of the head cover 30 meet the front end of the inner housing 52 (described later: see FIG. 6B).

The distance W1 between the inner walls of the left and right wall sections 32 of the head cover 30 shown in FIG. 3A (the internal dimensions in the left-right direction between the left and right wall sections 32) is larger than the width W0 in the left-right direction of a ferrule 51 of the optical connector 50 shown in FIG. 5. Accordingly, in cleaning, when the head cover 30 meets the front end of the inner housing 52, the ferrule 51 can be received inside the left and right wall sections 32 of the head cover 30. This makes it possible to push the cleaner 2 of the head 10 against the end faces of the ferrules 51, the head 10 being placed between the left and right wall sections 32 of the head cover 30.

The distance W2 between the outer walls of the left and right wall sections 32 of the head cover 30 shown in FIG. 3A (the external dimensions of the left and right wall sections 32) is slightly smaller than the distance W11 between the left and right inner walls of the outer housing 53 of the optical connector 50 shown in FIG. 5 (the internal dimensions in the left-right direction). Accordingly, in cleaning, when the head section 9A (the head cover 30) of the extending section 9 of the cleaning tool 1 is inserted inside the outer housing 53 of the optical connector 50 (see FIG. 6B), the left and right inner walls of the outer housing 53 can guide the outer surfaces of the left and right wall sections 32 of the head cover 30. Alignment of the cleaner 2 of the cleaning tool 1 to the end faces of the ferrules 51 is performed in the left-right direction.

The dimension H2 in the up-down direction of the left and right wall sections 32 of the head cover 30 shown in FIG. 3A (the dimension in the up-down direction of parts which protrude forward) is slightly smaller than the distance H11 of the upper and lower inner walls of the outer housing 53 of the optical connector 50 shown in FIG. 5 (the dimension in the up-down direction). Accordingly, in cleaning, when the head section 9A (the head cover 30) of the extending section 9 of the cleaning tool 1 is inserted inside the outer housing 53 of the optical connector 50 (see FIG. 6B), the upper and lower inner walls of the outer housing 53 can guide the upper and lower edges of the left and right wall sections 32 of the head cover 30. Alignment of the cleaner 2 of the cleaning tool 1 to the end faces of the ferrules 51 is performed in the up-down direction.

The distance between the upper and lower wall sections 31 of the head cover 30 shown in FIGS. 3A and 4 is substantially the same as the distance in the up-down direction of the outer housing 53 of the optical connector 50 shown in FIG. 5. Accordingly, in cleaning, the front edges of the upper and lower wall sections 31 of the head cover 30 meet the front ends of the outer housing 53 of the optical connector 50 (see FIG. 6B).

A mating optical connector (not shown) which will be attached to and detached from the optical connector 50 shown in FIG. 5 is attached to a printed board (printed circuit board) which is capable of being inserted into and removed from the plug-in unit. The mating optical connector is also composed of a plurality of (two in this embodiment) ferrules 51, an inner housing 52, and an outer housing 53.

Figure 6A:
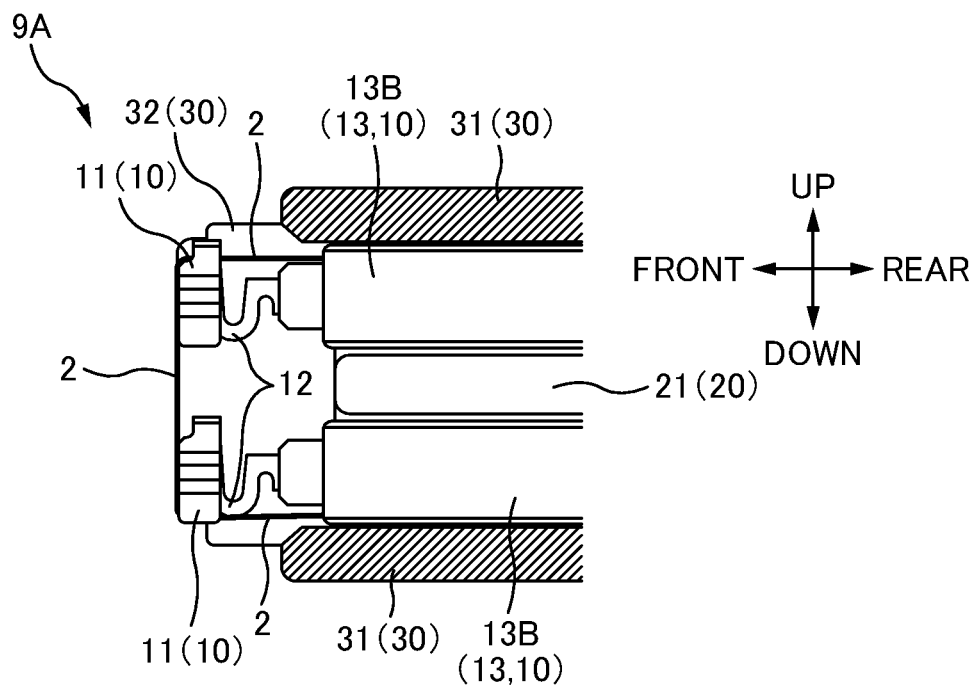
FIGS. 6A and 6B are diagrams illustrating an optical connector 50 in a cleaning operation.
Figure 6B:
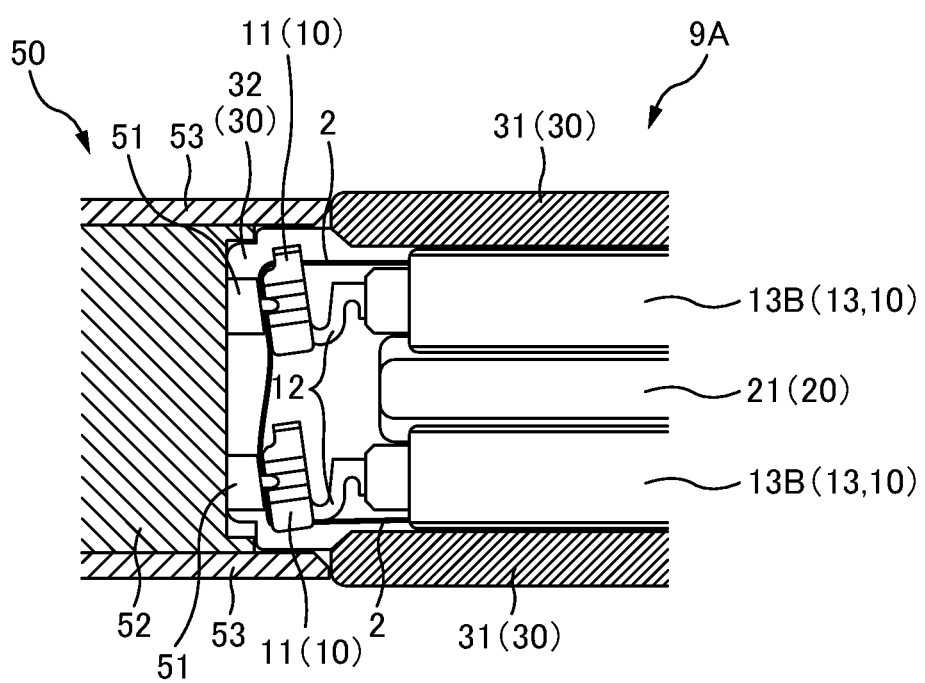

FIGS. 6A and 6B are diagrams illustrating the optical connector 50 which is in a cleaning operation. FIG. 6A is a diagram illustrating the head section 9A before cleaning. FIG. 6B is a diagram illustrating the head section 9A which is being cleaned.

When cleaning the optical connector 50, an operator holds the tool body 3 together with the body cover 3A, and inserts the head section 9A of the extending section 9 of the cleaning tool 1 inside the outer housing 53 of the optical connector 50. In this case, the operator inserts the head section 9A of the cleaning tool 1 while the wall sections 32 of the head cover 30 being guided by the inner walls of the outer housing 53. Thus, alignment of the cleaner 2 of the cleaning tool 1 to the end faces of the ferrules 51 is performed (in the up-down direction and the left-right direction).

When the head section 9A of the cleaning tool 1 is inserted into the optical connector 50, the pressing surfaces 11A of the heads 10 of the cleaning tool 1 meet the end faces of the ferrules 51 through the cleaner 2. From this position, the operator further inserts the head section 9A until the front edges of the head cover 30 meet a housing of the optical connector 50 (the outer housing 53 or the inner housing 52). Then, the heads 10 are subject to a rearward force due to pressure by the end faces of the ferrules 51. As a result, the pressing springs 17 is deformed by compression, and the heads 10 move rearward relative to the guide member 20. If the end faces of the ferrules 51 are inclined, the pressing sections 11 of the heads 10 are tilted by the tilting spring 12 according to the inclinations of the end faces of the ferrules 51. FIG. 6B illustrates this state.

As shown in FIG. 6B, from a state in which the front edges of the head cover 30 meet the housing of the optical connector 50, the operator moves the tool body 3, which the operator holds in hand, forward (towards the optical connector 50) (the pushing operation). At this stage, the front edges of the head cover 30 meet the housing of the optical connector 50, and thus the extending section 9 does not move relative to the optical connector 50. The rear part of the extending section 9 is received inside the tool body 3. Then, the operator performs the pulling operation to cause the extending section 9, which has been received inside the tool body 3, to return to the original position. As a result of a single set of the pushing operation and the pulling operation, a used portion of the cleaner 2 is transported to a position downstream from the pressing surface 11A of the lower head 10, and an unused portion of the cleaner 2 which is located upstream from the upper head 10 is supplied to the pressing surface 11A of the lower head 10.

In the present embodiment, the guide member 20 which is shared by the plurality of (two in this embodiment) heads 10 spanned by the cleaner 2 (the head guiding section 21) is placed sandwiched, and each of the heads 10 is independently guided by the guide member 20. Accordingly, in cleaning (during pushing operation and pulling operation), two heads 10 can push the cleaner 2 against the end faces of the corresponding ferrules 51 at a predetermined pressure. In the present embodiment, the guide member 20 is placed so as to be sandwiched between the plurality of (two in this embodiment) heads 10 spanned by the cleaner 2, and two heads 10 are guided by the shared guide member 20 (the head guiding section 21) in such a manner that the heads can move rearward. This makes it possible to narrow the distance between the heads 10 in the up-down direction, and it accordingly becomes possible to clean a plurality of (two in this embodiment) densely-packed ferrules 51 (two ferrules 51 whose distance in the up-down direction is small).

Second Embodiment

Figure 7:
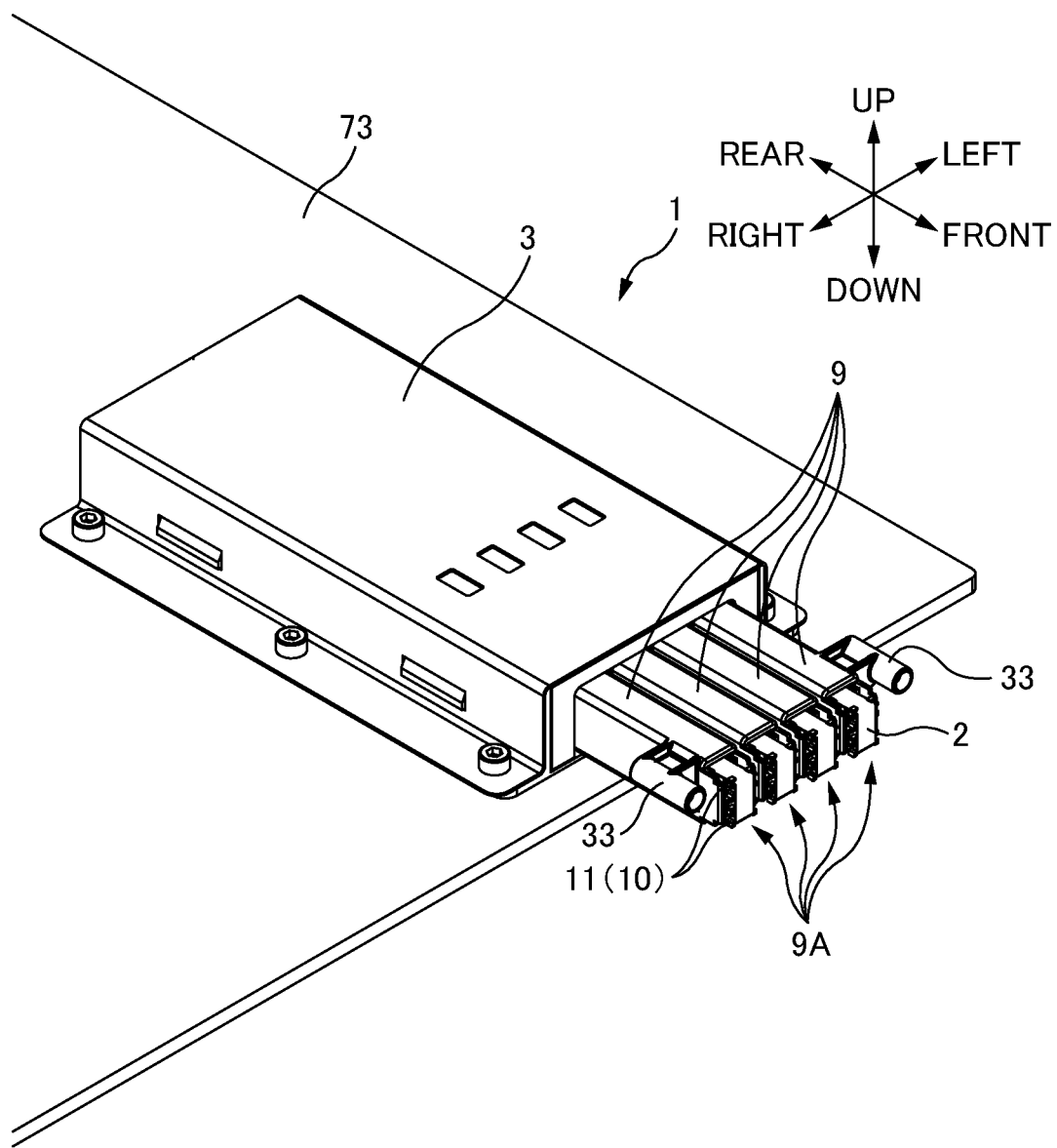
FIG. 7 is a perspective view of a cleaning tool 1 according to the second embodiment.
Figure 8:
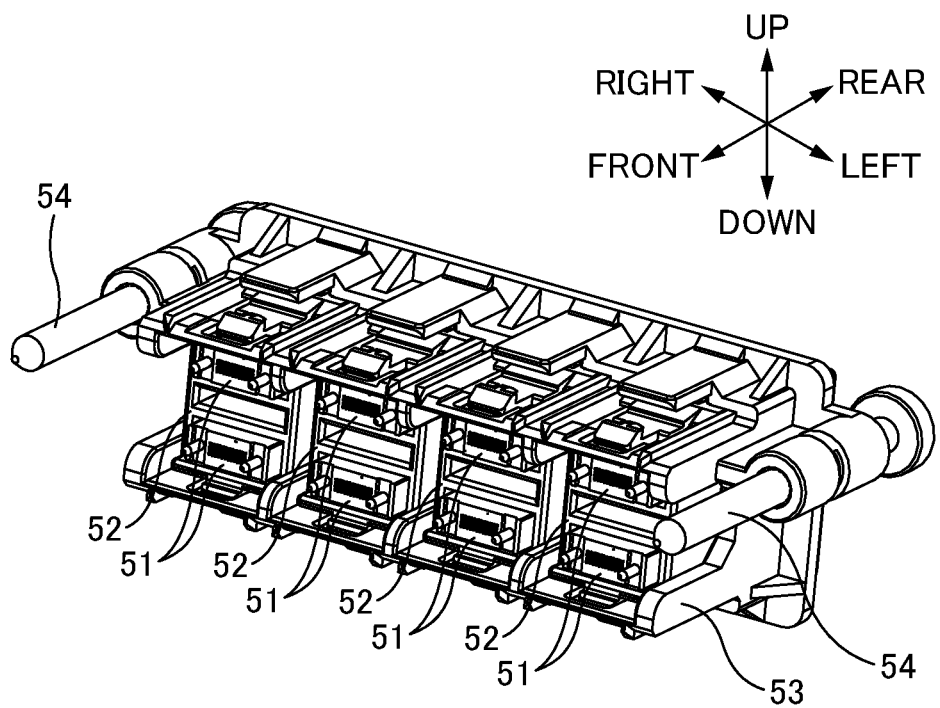
FIG. 8 is a diagram illustrating an optical connector 50 which is to be cleaned according to the second embodiment.
Figure 9:
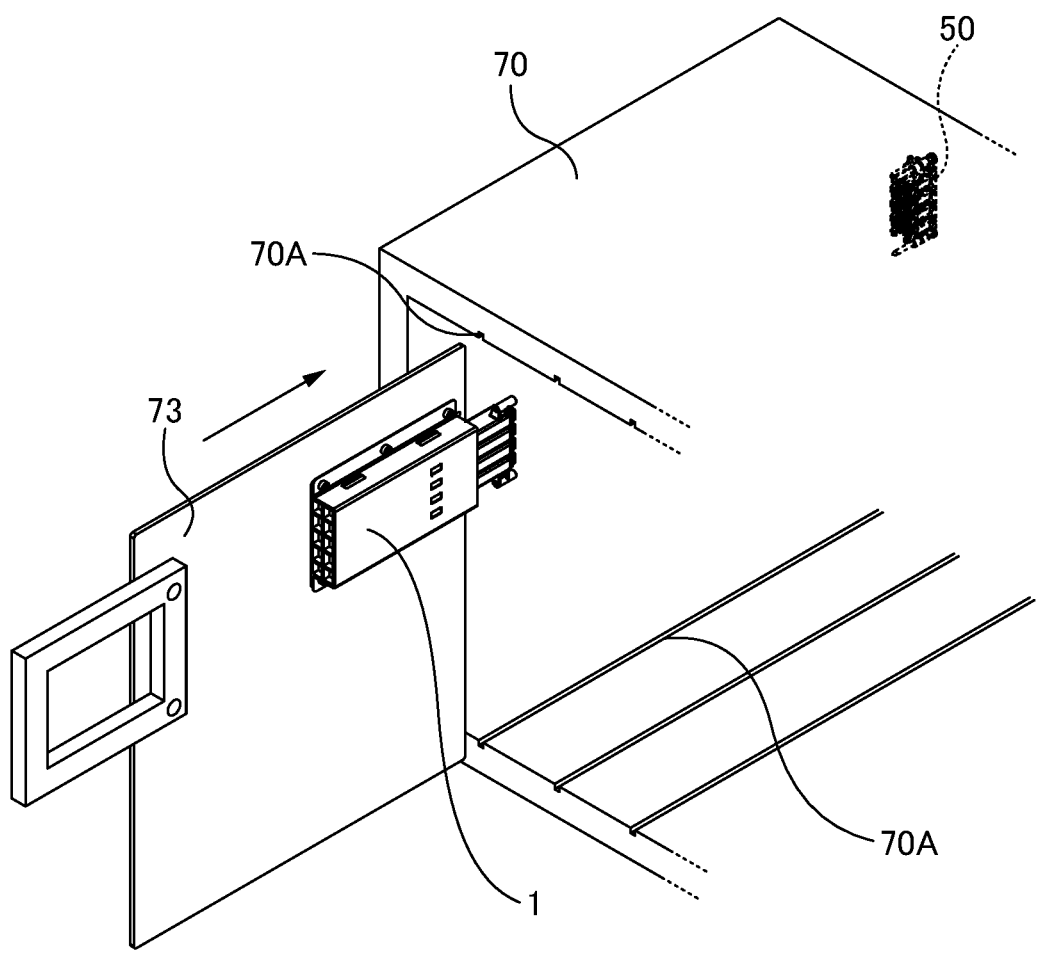
FIG. 9 is a diagram illustrating a cleaning in the second embodiment.

FIG. 7 is a perspective view of a cleaning tool 1 according to the second embodiment. FIG. 8 is a diagram illustrating an optical connector 50 which is to be cleaned according to the second embodiment. FIG. 9 is a diagram illustrating a cleaning in the second embodiment.

As shown in FIG. 7, the cleaning tool 1 according to the second embodiment includes: the tool body 3; and a plurality of (four in this embodiment) extending sections 9 which extend beyond the opening of the tool body 3. Each of the extending sections 9 has a head section 9A. Four head sections 9A are arranged in the left-right direction (the width direction of the cleaner 2).

Each of the head sections 9A has almost the same configuration as the first embodiment. That is, each head section 9A has a plurality of (two in this embodiment) heads 10, a guide member 20 and a head cover 30; the heads 10 is spanned by the cleaner 2, and the guide member 20 is sandwiched between the two heads 10. In the second embodiment, as with the first embodiment, the number of components can be reduced compared to the cases in which the guide member 20 is individually prepared for each head 10 and the cases in which each head 10 is individually accommodated in different head cover 30. It is also possible to narrow the distance of two heads 10 in the up-down direction, and it accordingly becomes possible to clean the plurality of (two in this embodiment) densely-packed ferrules 51 (two ferrules 51 whose distance in the up-down direction is small).

In the tool body 3, four supply reel s 4A (not shown) and four takeup reel s 4B (not shown) are provided, and each set of reels 4A and 4B correspond to each of the head sections 9A. In cleaning, the tool body 3 and the extending section 9 move relative to each other in the front-rear direction, and this relative movement makes it possible to supply an unused portion of the cleaner 2 from the supply reel 4A and to wind a used portion of the cleaner 2 around the takeup reel 4B.

The cleaning tool 1 according to the second embodiment has a pair of fitted sections 33. The pair of fitted sections 33 are placed aligned in the left-right direction such that a plurality of (four in this embodiment) head sections 9A are sandwiched therebetween in the left-right direction.

As shown in FIG. 8, the optical connector 50 according to the second embodiment has an outer housing 53 and four inner housings 52 which is accommodated in the outer housing 53. Each of the inner housings 52 has a plurality of (two in this embodiment) ferrules 51.

The optical connector 50 according to the second embodiment also has a pair of guide pins 54. The pair of guide pins 54 are placed aligned in the left-right direction such that the outer housing 53 are sandwiched therebetween in the left-right direction. In cleaning, the guide pins 54 of the optical connector 50 fits into the fitted sections 33 of the cleaning tool 1. And, alignment of the cleaner 2 of the cleaning tool 1 to the end faces of the ferrules 51 is performed in the up-down direction and the left-right direction.

As shown in FIG. 9, the optical connector 50 according to the second embodiment is a backplane connector which is attached to a connector wall (a midplane board or a backplane board) and is located further inside a plug-in unit 70. The cleaning tool 1 according to the second embodiment is attached to a board 73 of substantially the same size as a printed board for a plug-in unit.

An operator slides the board 73 in a guide groove 70A which is for a printed board, the board 73 having the cleaning tools 1 attached thereto. Then, the operator inserts the guide pin 54 of the optical connector 50 into the fitted sections 33 of the cleaning tool 1, and causes the pressing surfaces 11A of the heads 10 of the cleaning tool 1 to meet the end faces of the ferrules 51 through the cleaner 2. From this position, the operator further slides the board 73 inside, the rear part of the extending section 9 is received inside the tool body 3 (pushing operation). Next, the operator performs the pulling operation to cause the extending section 9, which has been received inside the tool body 3, to return to the original position. As a result of a single set of the pushing operation and the pulling operation, a used portion of the cleaner 2 is transported to a position downstream from the pressing surface 11A of the lower head 10, and an unused portion of the cleaner 2 which is located upstream from the upper head 10 is supplied to the pressing surface 11A of the lower head 10.

In the second embodiment, the cleaning tool 1 includes four extending sections 9, and is capable of simultaneously cleaning the end faces of eight ferrules 51 in total. Additionally, in the second embodiment, a single clean operation enables the cleaner 2 to be supplied to the head section 9A of each extending section 9 (that is, the cleaner 2 can be supplied to eight heads 10).

Further, in the second embodiment, the optical connector 50 is cleaned by sliding the board 73, to which the cleaning tools 1 are attached, in the guide groove 70A. And this makes it easy to clean the optical connectors 50 which are located further inside the plug-in unit 70.

Third Embodiment

Figure 10:
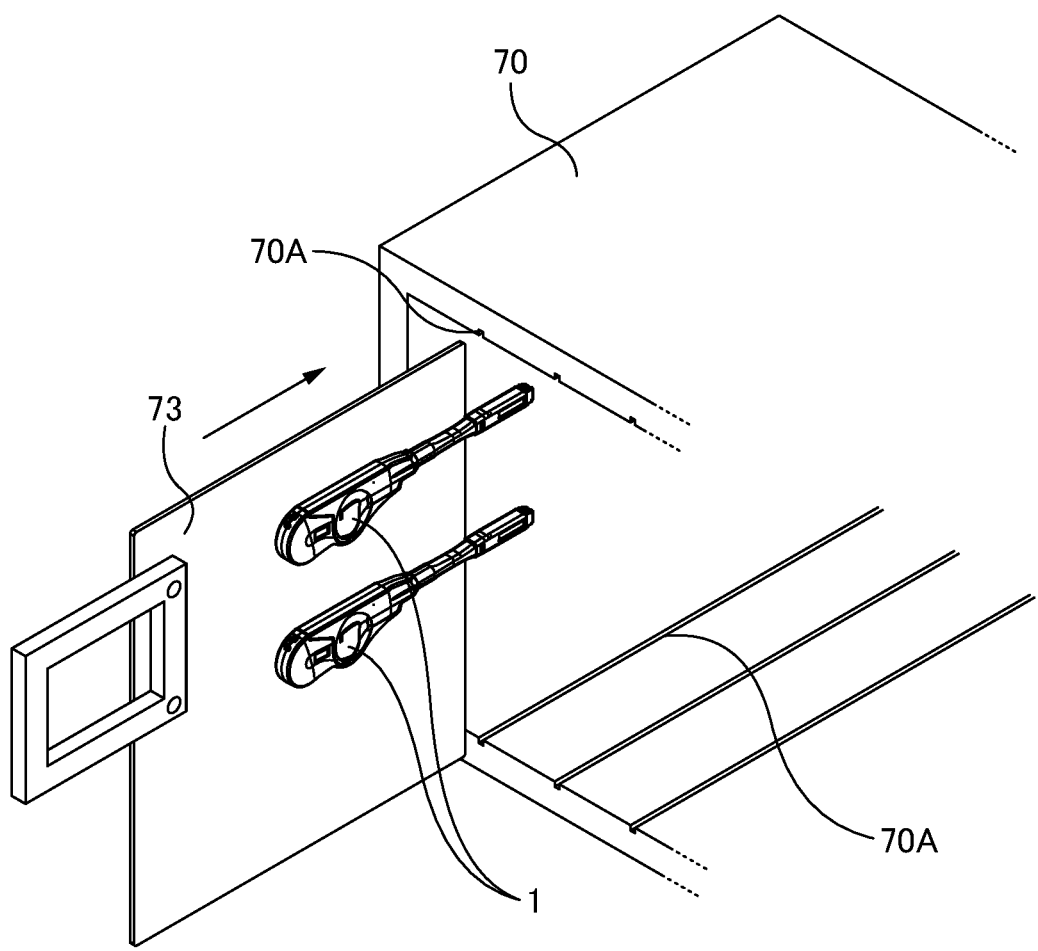
FIG. 10 is a diagram illustrating a cleaning in the third embodiment.

FIG. 10 is a diagram illustrating a cleaning in the third embodiment. In the third embodiment, two cleaning tools 1 according to the first embodiment are attached to a board 73 of substantially the same size as a printed board for a plug-in unit. As with the second embodiment, an operator slides the board 73, to which the cleaning tools 1 are attached, in a guide groove 70A. And thereby the optical connectors 50 (not shown) located further inside the plug-in unit 70 are cleaned. In the third embodiment, the cleaning tools 1 are capable of simultaneously cleaning the end faces of a plurality of (two in this embodiment) densely-packed ferrules 51.

In the third embodiment, the optical connector 50 is cleaned by sliding the board 73, to which the cleaning tools 1 are attached, in the guide groove 70A. This makes it easy to clean the optical connectors 50 located further inside the plug-in unit 70.

Others

The above-described embodiments are merely for facilitating the understanding of the invention, but are not meant to be interpreted in a manner limiting the scope of the invention. The invention can of course be altered and improved as in the following description, for example, without departing from the gist thereof and includes functional equivalents.

Number of Heads 10

In the foregoing embodiments, two heads 10 are provided in the head section 9A of the cleaning tool 1. However, the number of the heads 10 in the head section 9A is not limited to two, and three or more heads 10 may be provided. Even if the number of the heads 10 is three or more, when the guide member 20 is placed being sandwiched between ahead 10 and an adjacent head 10 (between certain two heads), the number of components can be reduced compared to the cases in which the guide member 20 is individually prepared for each head 10. In addition, it is possible to narrow the distance of the head 10 in the up-down direction, and it accordingly becomes possible to clean densely-packed ferrules 51 (the ferrules 51 whose distance in the up-down direction is small).

Tool Body 3 and Extending Section 9

In the foregoing embodiments, the tool body 3 and the extending section 9 can move relative to each other, and this relative movement enables the cleaning tool 1 to supply the cleaner 2 to the head 10. However, the configuration of the cleaning tool 1 and a method for supplying the cleaner 2 to the head 10 are not limited thereto. For example, the following configuration of the cleaning tool 1 may also be employed: a dial is provided in the cleaning tool 1; when an operator turns the dial, the cleaner 2 is supplied to the head 10 from a supply reel, and a used portion of the cleaner 2 is wound around a takeup reel. In this case, in cleaning, the operator turns the dial of the cleaning tool 1 while pushing the head 10 against the ferrule 51 over the cleaner 2. With such a configuration, the tool body 3 and the extending section 9 do not have to move relative to each other, and the foregoing pushing operation and pulling operation accordingly become unnecessary.

What is claimed is:

1. A cleaning tool for cleaning an optical connector including a plurality of ferrules, comprising:
   a plurality of heads;
   a shared cleaner that is shared by the plurality of heads, wherein
      each of the plurality of heads comprises a pressing surface that presses the shared cleaner against the ferrules, and
      the shared cleaner spans and is transported serially across the pressing surfaces of the plurality of heads;
   a mechanism that transports the shared cleaner from one of the heads to another of the heads;
   a guide member:
      that is placed sandwiched between the heads, and
      that guides the heads in such a manner that the heads move rearward; and
   a cover:
      that accommodates the plurality of heads and the guide member, and
      that exposes the cleaner.

2. The cleaning tool according to claim 1, wherein each of the heads is placed sandwiched between an inner wall of the cover and the guide member.

3. The cleaning tool according to claim 2, wherein a flange section is formed in each of the heads, a rail section is formed in the guide member, and the head is guided by the flange section that is received in the rail section.

4. The cleaning tool according to claim 1, wherein the optical connector has a housing that accommodates the ferrules,
an edge of an opening of the cover constitutes a meeting section that meets the housing, and
the opening is placed on a side towards the optical connector.

5. The cleaning tool according to claim 4, wherein the housing includes:
   an inner housing that accommodates the ferrules; and
   an outer housing that accommodates the inner housing,
the cover includes a wall section constituting a meeting section that meets the inner housing, and
the wall section is guided by an inner wall of the outer housing.

6. The cleaning tool according to claim 1, wherein if the optical connector is a backplane connector that is attached to a connector wall located further inside a plug-in unit,
the cleaning tool is attached to a board that slides in a guide groove formed on the plug-in unit, and
the guide groove is for a printed board.

7. The cleaning tool according to claim 1, wherein, at the pressing surfaces of the plurality of heads, the shared cleaner is bridged from an end of the pressing surface of one of the heads to an end of the pressing surface of another of the heads.

* * * * *